Nov. 17, 1970  R. POUIT  3,541,362
ELECTROMAGNETIC GENERATORS
Filed Feb. 19, 1969  6 Sheets-Sheet 1

INVENTOR
ROBERT POUIT
BY Bacon & Thomas
ATTORNEYS

Nov. 17, 1970 R. POUIT 3,541,362
ELECTROMAGNETIC GENERATORS
Filed Feb. 19, 1969 6 Sheets-Sheet 2

INVENTOR
ROBERT POUIT
BY
Bacon & Thomas
ATTORNEYS

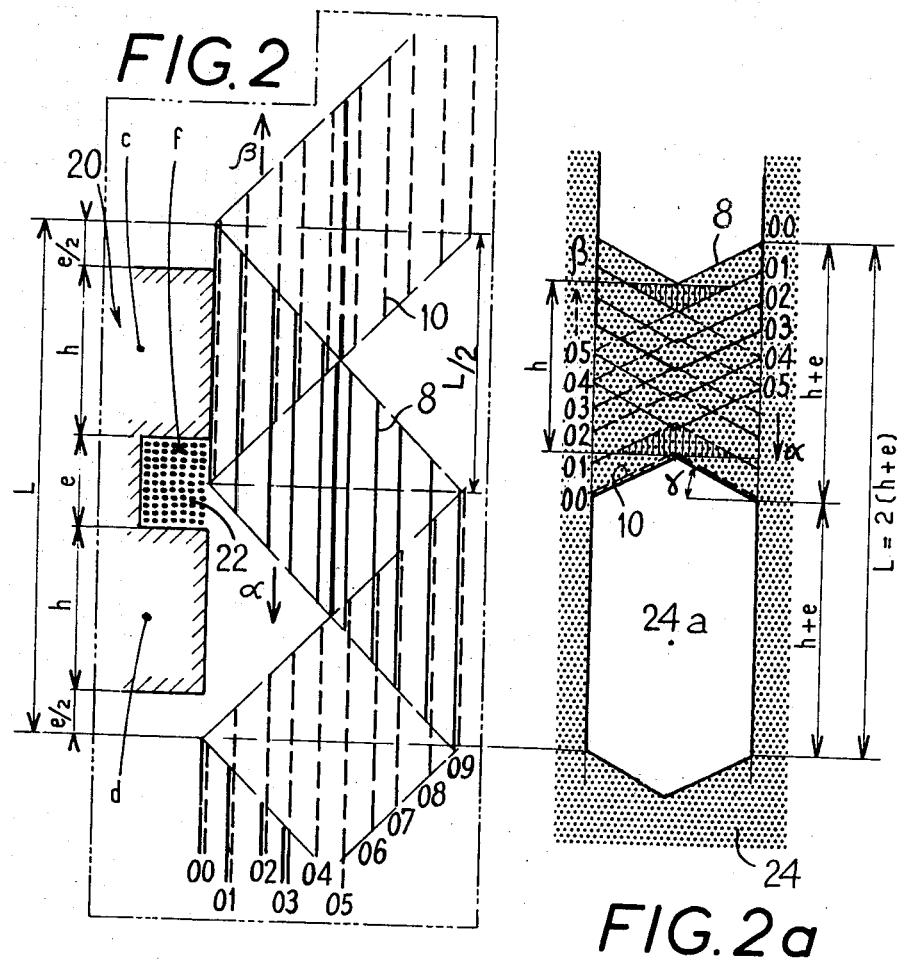
FIG. 2
FIG. 2a
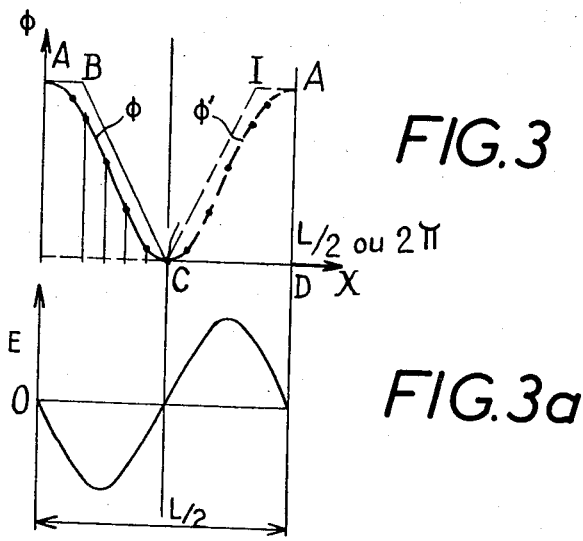
FIG. 3
FIG. 3a

Nov. 17, 1970  R. POUIT  3,541,362
ELECTROMAGNETIC GENERATORS
Filed Feb. 19, 1969  6 Sheets-Sheet 4

INVENTOR
ROBERT POUIT
BY Bacon & Thomas
ATTORNEYS

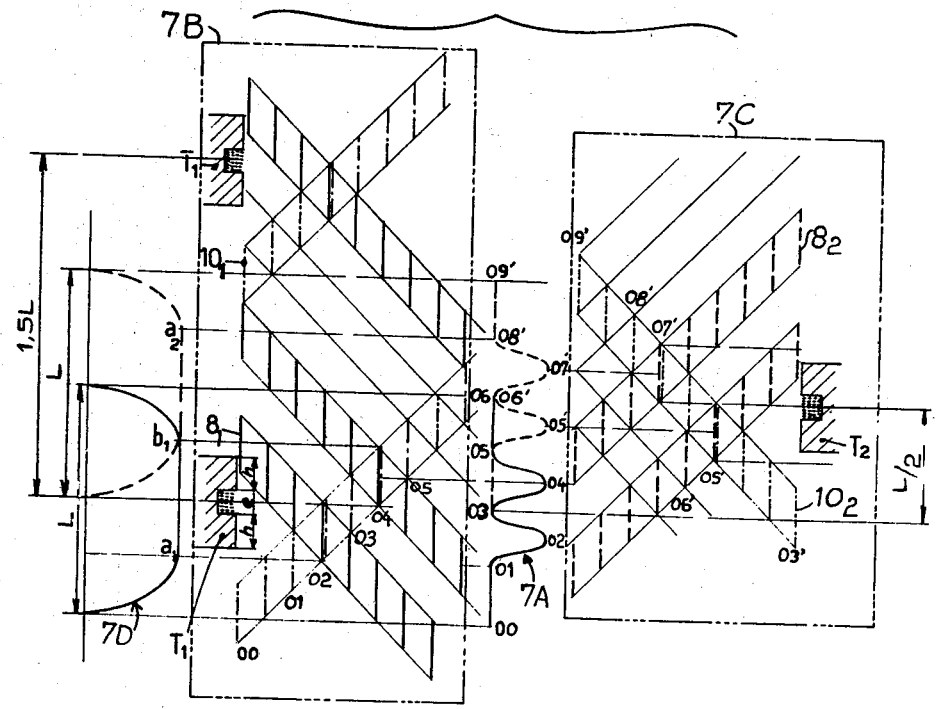
FIG.7
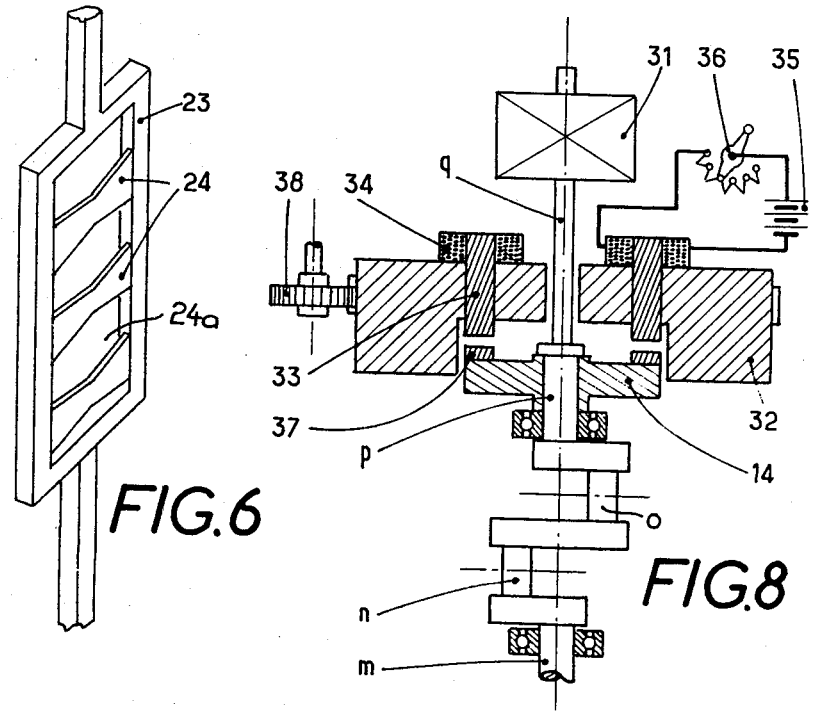
FIG.6
FIG.8

United States Patent Office 3,541,362
Patented Nov. 17, 1970

3,541,362
ELECTROMAGNETIC GENERATORS
Robert Pouit, 3 Rue Auguste Mayet,
Asnieres, Hauts-de-Seine, France
Filed Feb. 19, 1969, Ser. No. 800,467
Claims priority, application France, Feb. 23, 1968,
140,982
Int. Cl. H02k 35/06
U.S. Cl. 310—15                       12 Claims

ABSTRACT OF THE DISCLOSURE

An internal combustion engine linear alternator apparatus having a field magnet with an air gap containing two magnetic members reciprocable by an engine 180° out of phase with each other in overlapping relationship in said gap to produce reluctance variations in the magnet at a frequency which is a multiple of the frequency of reciprocation, and a method of operating such an alternator by reciprocating said members 180° out of phase with each other.

---

The present invention relates to reciprocating-motion alternators, including monophase and polyphase A.C. generators, more particularly to alternators which are, or are intended to be, connected to be driven by a heat engine or engines and which are termed thermomagnetic alternators.

The principle of operation of thermomagnetic linear alternators, in particular those of the free-piston type, is well known, as are the advantages which result from their application in the form of a system for producing magnetic flux change in a fixed assembly of field magnets by the displacement within an air-gap of said magnets of a light mobile component of soft iron.

Thermomagnetic alternators of the free-piston kind which have thus far been based on this principle exhibit, in addition to numerous fundamental drawbacks associated with difficulties of regulation, stability and starting, the further drawback that their power output is limited because the frequency of the currents produced is the same as that of the engine cycle so that the standard 50 c./s. frequency necessarily means an engine speed of 3000 firing strokes per minute, something which is virtually impossible to achieve in diesel engines above some tens of kilowatts.

It is therefore an object of the present invention to enable a relatively high frequency A.C. (50 c./s. for example) to be produced at a relatively low engine speed (some hundreds of cycles per minute, a cycle being a full revolution through 360° or an outward and return translatory movement).

In accordance with one aspect of the present invention, there is provided a method of generating alternating current by means of a reciprocating-motion alternator arrangement comprising a magnetic circuit of variable reluctance having a field magnet defining an air gap and two reluctance varying magnetic members in series overlapping relation in said air gap and each of which is reciprocable relative to said magnet; the method being to reciprocate said members 180° out of phase to vary said reluctance, and thus to generate an electric current in said alternator arrangement, at a frequency which is a multiple of the frequency of said reciprocating motion.

In accordance with a second aspect of the invention, there is provided an apparatus for generating alternating current comprising: a reciprocating-motion alternator arrangement; a magnetic circuit of said alternator arrangement with variable reluctance; a field magnet of said circuit having an air gap; two reluctance varying magnetic members of said circuit reciprocable in series overlapping relation in said air gap of said magnet; drive means for said alternator arrangement; and coupling means coupling said drive means to said members to produce reciprocating motion of said members 180° out of phase to vary said reluctance of said circuit, and thus generate an alternating current in said alternator arrangement, at a frequency which is a multiple of the frequency of said reciprocating motion.

Advantageously, there will be a series of said magnetic circuits providing a series of said air gaps in which said members simultaneously reciprocate, preferably linearly, said members each having high magnetic permeability zones separated by a zone of low magnetic permeability in the direction of reciprocation. Preferably, each high permeability zone is shaped to produce a substantially sinusoidal reluctance variation as a function of the displacement of said members.

The drive means is preferably a heat engine, such as a diesel engine.

The invention can be put into effect irrespective of the kind of heat engine used. However, it is particularly convenient to use an engine or engines of the free-piston kind, and preferably to use tandem engines, it being understood of course that the pistons in question are not wholly free but behave virtually as if they were so.

Numerous particular applications of the subject of the present invention are conceivable, in terms of fixed and mobile systems, such as generating sets for road and rail vehicles and ships.

For a better understanding of the invention and to show how the same may be carried into effect, reference will now be made, by way of example, to the accompanying drawings, in which.

Figure 1:
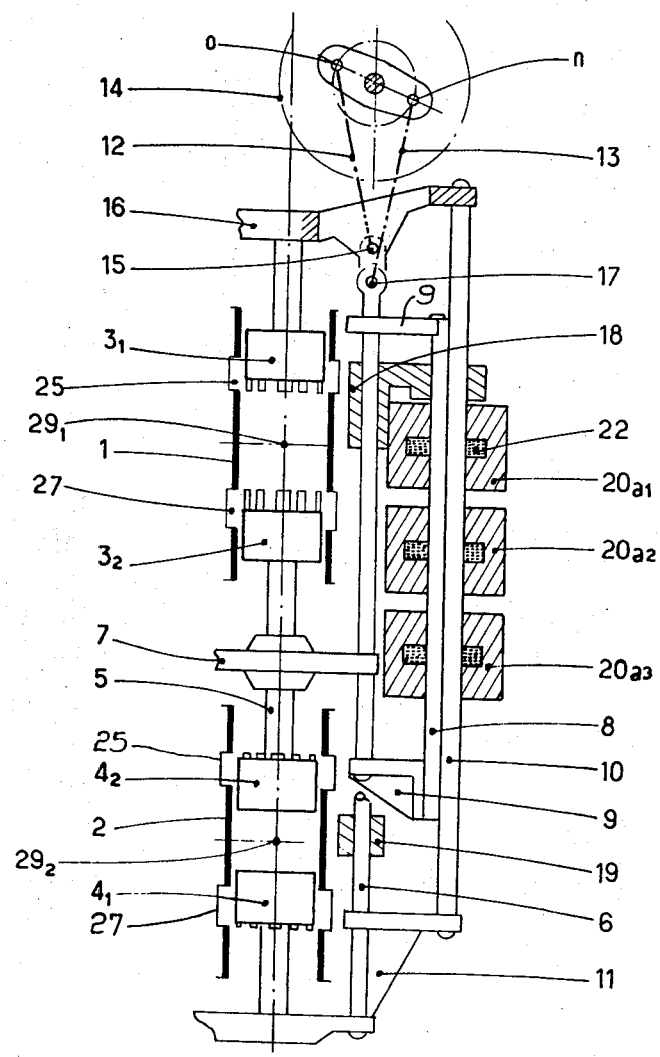
FIG. 1 is a highly schematic axial section showing a first embodiment of an internal combustion linear alternator having a two-cycle tandem engine with four pistons in an arrangement of opposed pairs, certain elements of the alternator having been omitted and others cut-away to facilitate the understanding of the figure.
Figure 9:
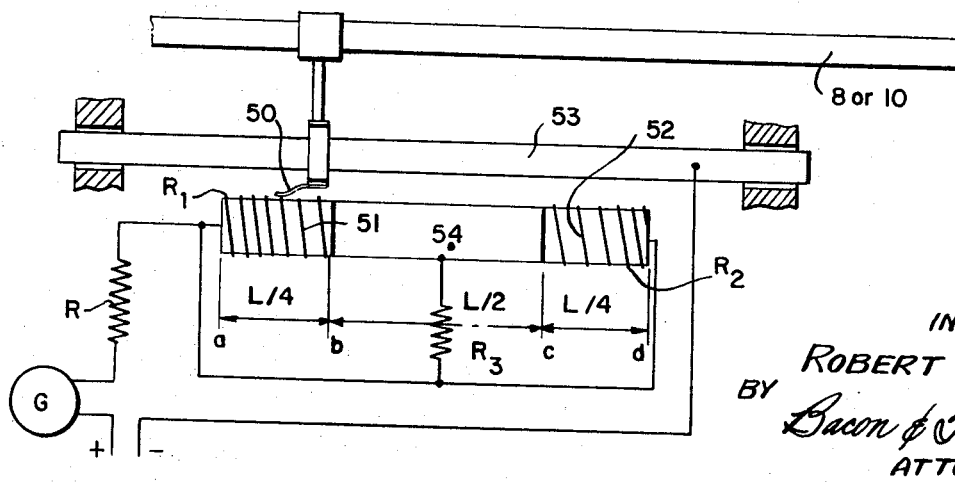
Figure 4B:
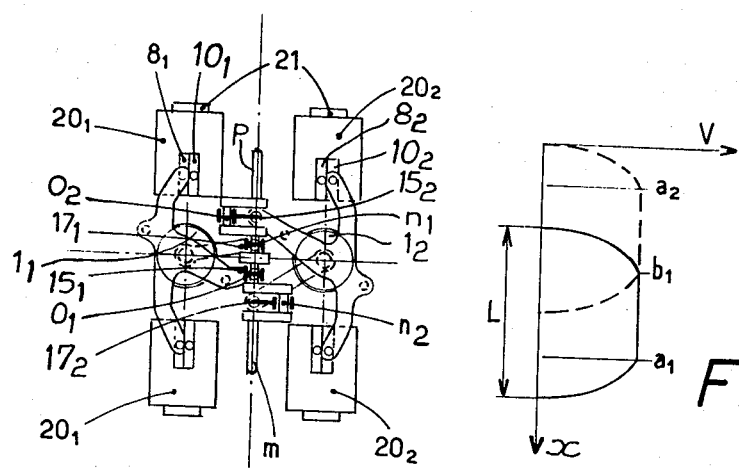
Figure 4C:
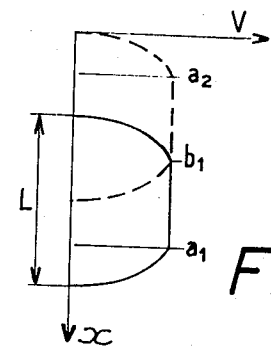
Figure 4:
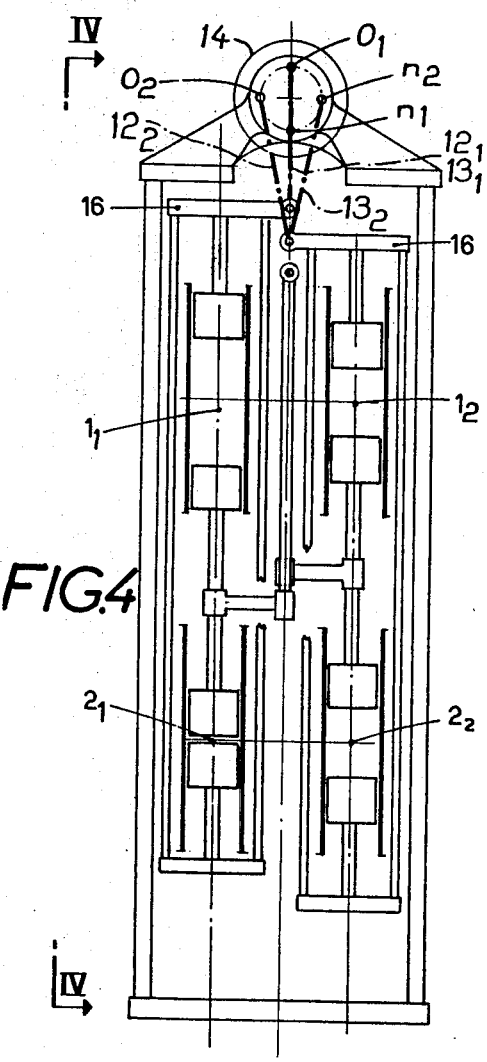
Figure 4A:
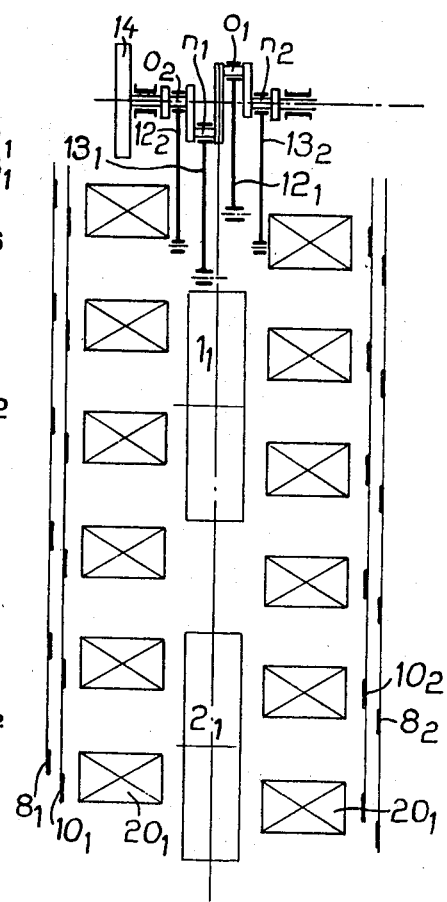
Figure 5:
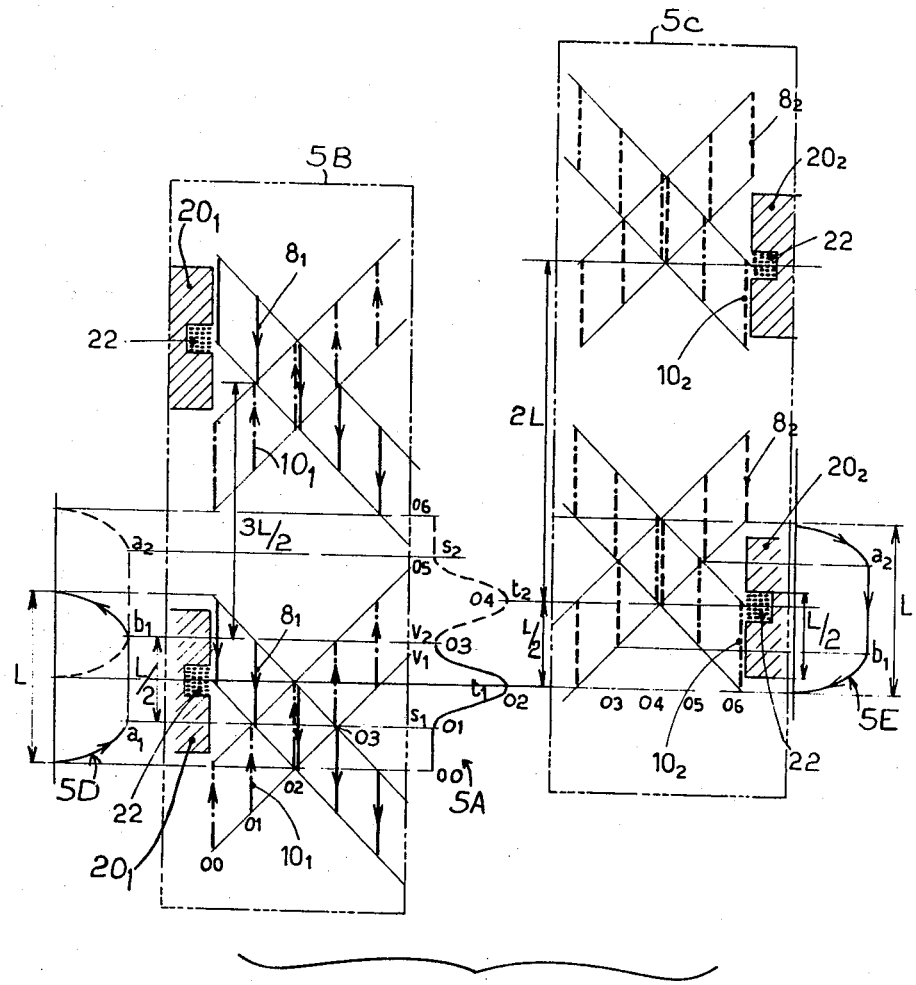

FIG. 2 is a diagram illustrating a fixed field magnet and a fixed armature of the alternator in the same plane as FIG. 1 and showing nine selected positions of moving parts of the system, these parts being two frames with rectangular openings and which have been shown in a simplified manner in that they have been given a lateral offset towards the right whereas in fact they are superimposed and contiguous with the field magnet and armature—the solid parts of a frame have been schematically indicated by full lines in the case of one frame and by broken-lines in the case of the neighbouring frame;

FIG. 2a is a diagram showing a modified form of the frames and corresponding to FIG. 2 except that the two frames are shown in a plane perpendicular to that of FIG. 2 six of the nine positions referred to hereinbefore being shown by full lines for one frame and broken-lines for the other frame;

FIG. 3 is a diagram illustrating the variation in magnetic flux $\phi$ in the alternator as a function of the distance $x$ of the frames from a fixed origin, the thin line corresponding to FIG. 2 and the heavy line to FIG. 2a;

FIG. 3a is a diagram showing the variation in the E.M.F. E of the alternator as a function of the distance $x$;

FIG. 4 is a schematic axial section of a second embodiment having two synchronous heat engines with two sets of linear alternators;

FIG. 4a is a simplified elevational view taken on the line IV—IV of FIG. 4 and showing diagrammatically the two sets of alternators and their attachments;

FIG. 4b is a plan view of FIG. 4;

FIG. 4c is a diagram which illustrates, for the embodiment of FIGS. 4 to 4b, the variation in the velocity V of the frames of one set of alternators (full lines) and the variation in the velocity V of the frames of the other set of alternators (broken lines) as a function of the distance x of said frames from a fixed origin;

FIG. 5 is a diagram which illustrates at 5A the variation in the magnetic flux in the field magnets of the second embodiment shown in FIGS. 4 to 4b, at 5B and 5C diagrams corresponding to those of FIG. 2 and relating to the two sets of alternators, and at 5D and 5E diagrams corresponding to FIG. 4c relating to respective sets of alternators;

FIG. 6 is a perspective view showing a frame of the kind schematically indicated in FIG. 2a;

FIG. 7 is a diagram similar to that of FIG. 5 showing at 7A the variation in magnetic flux in the field magnets of a further embodiment and at 7B, 7C and 7D diagrams for this further embodiment corresponding to the diagrams 5B, 5C and 5D respectively of FIG. 5;

FIG. 8 is a schematic section illustrating a starter for the heat engine or engines of the illustrated embodiments; and FIG. 9 is a schematic detailed illustration of a control rheostat arrangement for controlling excitation of field magnets.

Figure 1A:
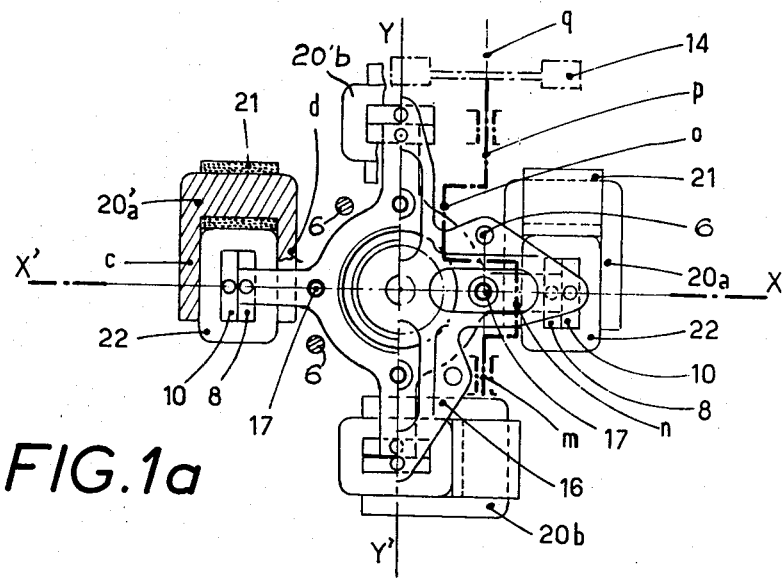
FIG. 1a is a plan view of the alternator of FIG. 1, again highly schematic in nature and partly in transverse section.

FIGS. 1 and 1a illustrate an alternator set coupled to a heat engine in a four-piston two-cycle tandem array. The engine has two cylinders 1 and 2 on the same axis. In the cylinder 1 two pistons $3_1$ and $3_2$ are slidably mounted and operate in opposite directions; similarly, in the cylinder 2, there are two other opposed and oppositely operating pistons $4_1$ and $4_2$. The inner pair of pistons $3_2$ and $4_2$ are rigidly connected together by a rod 5 carrying a crosshead 7. The outer pair of pistons $3_1$ and $4_1$ are also connected rigidly together in this case by rods 6 (only part of one of which can be seen in the drawing) extending outside and parallel with the axes of said cylinders, said rods 6 being fixed to crossheads 16 forming extensions of the external pistons $3_1$ and $4_1$.

The inner pistons $3_2$ and $4_2$ are coupled to a first magnetic system 8 through the medium of the cross-head 7, a rod 17 parallel to the rods 6 and brackets 9. The rod 17 is mounted in at least one guide element or slideway 18. The outer pistons $3_1$ and $4_1$ are similarly coupled to a second magnetic system 10, through the medium of crossheads 16, rods 6 and brackets 11. The rods 6 are mounted in at least one guide element or slideway 19.

A synchronising device couples the two magnetic systems 8 and 10 and consequently the two pairs of pistons, so that their opposed movements are coupled and synchronised. This device is preferably kinematic in nature and in this example is constituted by two links 12 and 13 respectively articulated to the two opposite crank pins $o$ and $n$ of a crankshaft $mnop$ (FIG. 1a) the end journals $m$ and $p$ of which are carried in fixed bearings, one of said journals being coupled to a low-inertia flywheel 14. The base of the link 12 is coupled to a pivot 15 carried by the top crosshead 16 whilst the base of the link 13 is coupled to a pivot at the end of the rod 17.

It will be seen, therefore, that the coupling of the opposed movements of the two piston pairs $3_1$, $4_1$ and $3_2$, $4_2$, is positively ensured and that at the same time the transmission of these opposed movements to the magnetic systems 8 and 10 is equally ensured.

The magnetic alternator comprises fixed field magnets 20a and 20'a, arranged in line in the same longitudinal axial plane XX' (FIG. 1a) and symmetrically on either side of the body of the heat engine. The field magnets in each line are arbitrary in number, three for example having been shown in FIG. 1 and having been marked $20a_1$, $20a_2$ and $20a_3$. Similarly, in a second axial plane YY' perpendicular to the first, two other sets of field magnets 20b and 20'b are located symmetrically. All these field magnets are excited in parallel by field coils 21 and cooperate in each case with a fixed armature, constituted by an assembly of conductors 22. These conductors are located in a slot $f$ formed in each of the field magnets and dividing each magnet into two flux branches $c$ and $d$ (FIG. 2).

Armature current is produced in the conductors 22 of the magnets 20a by the variation in reluctance brought about by the alternating, coupled antiphase movements of the systems 8 and 10 closely adjacent one another in the air gaps of the field magnets 20a. The same applies to the other field magnets 20a, 20b and 20'b, the magnetic systems of which are driven in identical fashion by the engine.

As FIG. 6 shows, each of the magnetic systems 8 and 10 is constituted by a high-strength frame 23 in which there are arranged equidistant divided blocks of exerasoft iron 24, separated from one another by empty spaces. The blocks constitute zones of high magnetic permeability and the intermediate spaces zones of low (virtually zero) magnetic permeability. Through the interference between the solid and empty parts of the two frames in the airgaps of the field magnets, variations in magnetic flux are brought about which produce alternating armature currents.

FIG. 2 shows one fixed field magnet 20 and its armature 22, together with nine relative positions of the frames 8 and 10, which execute coupled opposed displacements in the directions of the arrows $\alpha$ and $\beta$, said nine positions 00 to 09 corresponding to nine equal fractions of the total travel L of said frames. Bearing in mind the fact that the magnetic permeability of soft iron is around 400 times that of air, the instantaneous reluctance in any of the branches of the field magnet $c$ and $d$ can be derived, the reluctance depending substantially on the area of interference (overlap) of the full or solid parts 24 of the frames 8 and 10. Therefore, in order to determine that reluctance, it is merely necessary to measure in respect of each position the common area, opposite the branch $c$ or $d$, of the full part (represented by full lines) of the frame 8 and the full part (represented by broken-lines) of the frame 10. As illustrated, the height $e$ of the slot $f$ is equal to the distance separating two field magnet blocks, the height of each block being given by $2h+e$ ($h$ being the height of each of the two polepieces ($c$ and $d$) of a full field magnet). L is the total travel, both in the upward and the return stroke of the moving systems. If the three parameters L, $h$ and $e$ are linked by the equation $$L=2(h+e)$$

the following features will be seen from an examination of FIGS. 2 and 3.

If the empty parts of the frames 8 and 10 are rectangular (as intended in FIG. 2), the variation in magnetic flux in the branch $c$ is illustrated by the polygonal line ABCD for a relative displacement of the frames equal to the total travel L (FIG. 3).

The variation in flux in the branch $d$ is represented by the mirror image of the polygonal line ABCD and is offset in phase by half the total travel $L/2$ (FIG. 3).

The result is that the total variation in magnetic flux in the field magnet is represented by the polygonal line ABCIA of periodicity $\pi$ corresponding to $L/2$ (FIG. 3). In these circumstances, for each total travel L, two cycles of alternating current are produced and, consequently, the frequency of the alternator of FIG. 1 is four times higher than the cycle frequency of the engine (one cycle being one out stroke+one return stroke).

The variation in total flux as a function of the displacement of the frames 8 and 10, as defined by the line ABCIA, may not have a desirable form for some applications because of its asymmetry and its abrupt changes.

In accordance with a preferred feature, applicable, for example, to the first embodiment of FIGS. 1 and 1a, a substantially sinusoidal flux characteristic can be produced by giving the empty parts 24a of the interfering frames 8 and 10 a shape other than rectangular. As illustrated in FIGS. 2a, 3 and 3a, the area of the emtpy zones may be increased at the expense of the solid zones 24, whilst retaining the same height $h+e$ (FIG. 2a) at the longitudinal edges of both the empty and the solid zones.

To this end, and as shown in FIG. 2a, the emtpy zones 24a are given an elongated hexagonal profile including a V formation of their transverse edges projecting into the solid zones 24. The slope $\gamma$ of these edges (FIG. 2a) will advantageously be somewhere between 15° and 30°, and preferably 22°. If the frame 8 is made to slide over the frame 10, by displacing the two frames through the same distance but in opposite directions (this can be represented by for example sliding two tracings over one another), it will be observed that by interference a corrective variation (corrective that is to say in relation to the arrangement of FIG. 2) is provided in the overlapping area offered to the magnetic flux in the air-gaps of the field magnets. This will be understood by reference to the diagram of FIG. 2a, in which it will be seen that when the solid zones interfere, dead triangular areas are created which reduce the effective area offered to the flux.

In the preferred embodiment described (FIG. 2a and $\gamma=22°$), the flux characteristic departs from the curve ABCIA and becomes a substantially sinusoidal curve $\phi$, $\phi''$ (FIG. 3), the majority of the points on which obey the sinusoidal law $\phi=\phi_{max}/2.(1+\cos x)$, only certain points deviating from this law and even then only be less than 1%. The flux curve can be made strictly sinusoidal as a function of the coupled displacement by giving the transverse edges of the empty zones 24a a slight curvature.

Whereas each of the curves $\phi$ (in the branch $c$) and $\phi'$ (in the branch $d$) is based upon the period L, the resultant curve $(\phi+\phi')$ is of period $L/2$; consequently, the alternator frequency is four times higher than the cycle frequency of the engine.

The E.M.F. produced in the armature conductors 22 (shifted in phase by $\pi/2$ in relation to the magnetic flux $\phi+\phi'$) therefore itself has a sinusoidal characteristic of period $L/2$ as a function of the displacement of the frames, and will have a frequency of four times the engine cycle frequency if, as proposed, the engine is of the two-cycle kind.

Each time the engine passes through top dead-centre or bottom dead-centre, the change in direction of movement of the openwork frames 8 and 10 changes the direction of the alternating armature current which, since it passes through the same absolute values at the same relative positions of the frames, has the same kind of continuity as in conventional multipole rotary alternators.

It is nevertheless important to bear in mind that whilst the variation in the overlapping area offered to the magnetic flux is sinusoidal as a function of the displacement $x$, the variation in magnetic flux and in E.M.F. is not sinusoidal as a function of time, because of the variation in linear velocity of the moving engine parts and magnetic systems over the length of the full travel L, this variation only being at all substantial in the quadrants neighbouring the dead-centre points.

The sinusoidal time function of the magnetic flux and the E.M.F. may be maintained, however, by varying the excitation current in the field coils 21 in reverse sense to the variations in the linear velocity.

To this end, a generator for the excitation current may be connected across the field coils 21 through the medium of a corrective switching device. This device may be provided by the commutator of the generator by appropriate distribution of its commutator bars and appropriate choice of their areas. It can also be achieved in each embodiment in a different way. For example (see FIG. 9), a rheostat may be provided, the slider 50 of which is connected to the respective frame 8 or 10 and is applied against two fixed resistance coils 51, 52 extending parallel to said frames within the quadrant travel sections neighbouring the dead-centre points; the pitch of the windings of these coils is preferably varied in order to produce a corrective effect dependent upon the shape of the velocity curve in these quadrants.

A second embodiment of thermomagnetic linear alternator will now be described with reference to FIGS. 4 to 5, this embodiment being intended to avoid any need to interfere with the excitation current in the field coils 21, whilst retaining a substantially sinusoidal time function of the armature current. To this end, use is made of a characteristic of four-piston, two-cycle tandem engines, in accordance with which the linear velocity of the moving parts is substantially constant over the central half of their travel (section $a_1$ to $b_1$ of the curve of FIG. 4c), this velocity varying considerably in the two terminal quarters of travel neighbouring the dead-centre points.

In accordance with this second embodiment, two tandem engines of the aforementioned kind, $1_1$, $2_1$ and $1_2$, $2_2$, are combined in parallel with one another and in such a fashion that, through the medium of a synchronising device, such as has been described, they operate out of phase with one another by the amount of half the total travel $L/2$ (FIG. 4). In this case, the synchronising device is again a crankshaft but this time a four-throw crankshaft. Crakshaft pins $o_1$ and $n_1$ are connected by links $12_1$ and $13_1$ to the outer and inner piston pairs of the engine $1_1$ and $2_1$, and thus to frames $10_1$ and $8_1$ respectively, and crankshaft pins $o_2$ and $n_2$ are connected by respective links $12_2$ and $13_2$ to the outer and inner piston pairs of the engine $1_2$, $2_2$ and thus to the frames $10_2$ and $8_2$ respectively; the diametrally opposite crank pins $o_1$ and $n_1$ are arranged at right-angles on the crankshaft in relation to the crank pins $o_2$ and $n_2$ which are likewise diametrally opposite one another. As FIG. 4b shows, at both sides of the engine $1_1$, $2_1$ there is a set of fixed field magnets $20_1$ (equipped with field coils 21 and armatures 22) co-operating with frames $8_1$ and $10_1$; in a similar way, at both sides of the engine $1_2$, $2_2$, there is a set of fixed field magnets $20_2$ (equipped with field coils 21 and armatures 22) co-operating with frames $8_2$ and $10_2$.

Because the two engines are out of phase with one another by half the total travel, the mobile magnetic systems can be considered as operating at constant velocity over the full travel L (FIG. 4c) since one of these assemblies, driven by one of the engines, can be rendered operative exclusively over the linear part $a_1$ to $b_1$ of the travel, and the other, driven by the other engine can be rendered operative exclusively over the complementary linear part $b_1$ to $a_2$ of said travel.

In order to clarify the operation of this second embodiment of the alternator, reference is now made to FIG. 5 in which, at 5B and 5C, there are diagrams similar to those of FIG. 2. The diagram 5B relates to the field magnets $20_1$ and the frames $8_1$ and $10_1$ schematically illustrated in full line and chain-dotted fashion respectively, whilst the diagram 5C relates to the field magnets $20_2$ and the frames $8_2$ and $10_2$ illustrated in broken lines and chain-dotted fashion respectively. The diagrams 5B and 5C, as well as the velocity diagrams 5D and 5E, are illustrated in FIG. 5 in their true axial geometric positions.

The following conditions apply:

As before, the height of the field magnets is determined by the law: $2(h+e)=L$;

The pitch of the field magnets of one and the same set, that is to say the distance separating their centres, is equal to $2L$;

The two sets of field magnets $20_1$ and $20_2$ are axially offset in relation to one another by half the total travel $L/2$;

The height of the full zones 24 of the frames 8 and 10 is equal to half the total travel $L/2$; and The height of the empty zones 24a separating two consecutive full zones is equal to three times the height of said full zones, that is to say $3L/2$.

These conditions being satisfied, FIG. 5 shows that:

On the one hand, exclusively during the travel $a_1$ to $b_1$ of the engine $1_1$, $2_1$, the frames $8_1$ and $10_1$ produce in the field magnets $20_1$ a flux variation $s_1$, $t_1$, $v_1$ which is sinusoidal as a function of time since the velocity is constant over this distance;

On the other hand, exclusively during the travel $b_1$ to $a_2$ of the engine $1_2$, $2_2$, the frames $8_2$ and $10_2$ produce in the field magnets $20_2$ a flux variation $v_2$, $t_2$, $s_2$ which is likewise sinusoidal as a function of time since the velocity is constant over the distance considered; and Finally, the two periods $s_1$, $t_1$, $v_1$ and $v_2$, $t_2$, $s_2$, are strict continuations of one another since the two sets of field magnets $20_1$ and $20_2$ are staggered axially in relation to one another by half the total travel $L/2$.

The result of this is that with each outward stroke and with each return stroke of the mobile systems, there are two alternations in the armature current, and therefore the frequency of this current is four times the cycle frequency of the two engines.

In respect of all the field magnets located in the same axial plane of an engine, whether in the first or the second embodiment, the armature currents induced are cophasal and the armature conductors 22 therefore act as coils connected in parallel. In order to produce polyphase currents, the alternator can be fitted with field magnets 20 in as many axial planes as there are phases required. The phase-shift is produced either by axially staggering the groups of openwork frames 8 and 10 in relation to the engine assemblies, or by axially staggering the groups of field magnets, the pairs of frames then remaining in phase with one another. Thus, if a two-phase current is to be produced, the sets of field magnets $20b$ and $29a$ situated in two perpendicular axial planes $XX'$ and $YY'$ (FIG. 1) will be axially offset by $L/8$, corresponding to a phase-shift of $\pi/2$.

It is important to note that the tandem arrangement of the two engine cylinders 1 and 2, in order to create a two-cycle arrangement with a complete one-cycle phase-shift between said cylinders, has the advantage that the same forces are transmitted to the magnetic systems during the opposite extensions of one and the same cycle of engine operation. The work of compression in one of the cylinders of such a tandem arrangement is accordingly directly derived from the work of expansion in the other engine cylinder, so that there is no need to store any kinetic energy in the flywheel 14 and the latter can therefore have low inertia. The modulation of the velocity of the systems is thus substantially a function only of the mass of said systems, the motive power and the instantaneous resistance. The kinemtaic elements (links 12 and 13 and the crankshaft) which couple the opposed movements of the two systems therefore only have to transmit very low forces of the kind produced either from differences in friction or resistance or in irregularities in the fuel supply introduced into the two engines (in addition to the energy absorbed by auxiliary devices to be described which can advantageously be driven by the coupling shaft $q$ shown in FIGS. $1a$ and 8).

The valving of each of the engines 1 and 2 with their two opposed pistons is effected conventionally, as with two-cycle equiflow scavenging pistons, by means of ports which are uncovered in the outward travel regions of the pistons by the pistons themselves. As far as the introduction of combustion air is concerned, the relevant ports are in the form of openings 25 (FIG. 1) communicating with the atmosphere (or with the discharge side of a supercharger in the case of a blown engine). The exhaust ports are in the form of openings 27 (FIG. 1) which communicate with an exhaust manifold (or with the intake side of the turbine of a turbocharger).

The fuel is introduced in the conventional way using injectors $29_1$ and $29_2$ (FIG. 1) which supply the fuel either directly as a consequence of an impulse from a pump driven by the shaft $q$, or as a consequence of discharge across the orifice of a control valve from an accumulator charged up by a pump.

All auxiliary means, such as those for circulating coolants (pump and fan) as well as for lubrication, can be controlled from the shaft $q$. For example, as FIG. 8 shows, an electrical generator 31 producing the excitation current for the coils 21 of the field magnets 20 can be driven by the crankshaft $q$.

In the two first embodiments (of FIGS. 1 to 6) the electrical frequency obtained is four times the cycle frequency of the engine. However, for some applications the alternator power may be limited, on the one hand by the linear velocity of the pistons (this being limited in turn by engineering considerations) and on the other hand by the frequency standard imposed (for example 50 c./s. which is the mains frequency standard most generally used).

For example, if it is desired to produce a 2,500 kw. alternator with two tandem engines of 64 cm. stroke for operation at 375 r.p.m. (corresponding to a linear velocity of 8 m./sec.), the 50 c./s. standard electrical frequency will require four cycles per stroke, that is to say 8 cycles per engine cycle.

In order to achieve this result, a third embodiment illustrated in FIG. 7 has been devised. In this third embodiment, as in the second, there are two tandem engines one of which co-operates with at least one set of field magnets $T_1$ and the other with at least one set of field magnets $T_2$ through a first set of frames $8_1$ and $10_1$ and a second set of frames $8_2$ and $10_2$ respectively.

It will be observed that in this third embodiment:

The height of the field magnets is half the former height and is determined by the relationship $2(h+e)=L/2$;

The pitch of the field magnets of one and the same set is equal to $3L/2$;

The two sets of field magnets $T_1$ and $T_2$ are axially staggered relatively to one another by half the total travel $L/2$;

In respect of the frames 8, two solid zones 24 are separated by an empty zone $24a$, and all its zones have the same height $h+e=L/4$; and In respect of the frames 10, two solid parts 24 of height $L/4$ are separated by an empty zone $24a$ the height of which is five times greater, namely $5L/4$.

These conditions being satisfied, FIG. 7 shows that:

On the one hand, exclusively during the constant speed half travel $a_1b_1$ of one engine, the frames $8_1$ and $10_1$ produce in the field magnets $T_1$ two cycles of flux variation, 01 to 05 (see diagram 7A), which variation is sinusoidal as a function of time;

On the other hand, exclusively during the constant speed half travel $b_1a_2$ of the second engine, the frames $8_2$ and $10_2$ produce in the field magnets $T_2$ two other cycles of flux variation 05 to 08' (see diagram 7A), which variation is likewise sinusoidal as a function of time; and Finally, the two cycles 01 to 05 and 05 to 08' form perfect continuations of one another because of the axial stagger of the field magnets $T_1$ and $T_2$ by the amount $L/2$.

From the foregoing, it is evident that with each outward stroke and each return stroke, the armatures produce four cycles of alternating current whose frequency is accordingly eight times the cycle frequency of the engines.

In the manner generally provided for in free-piston engines, starting can be achieved by the direct injection of high-pressure compressed air into the engine cylinders, but it would appear preferable, in order to make the thermomagnetic alternator a self-contained entity, to use the kinematic coupling linkage to effect starting.

To this end, and as FIG. 8 shows, an auxiliary flywheel 32 is mounted in sliding fashion on the shaft $q$ and is able to rotate freely thereon. It carries magnetic components 33 surrounded by excitation coils 34 which can be supplied with current from an external source 35. A rheostat 36 is arranged between said source and the coils 34 in order to control excitation. The flywheel 32 is fixed to a gear meshing with a further gear 38 connected either to a crank handle through the medium of a gear train, or to an auxiliary electric motor which may be, for example, a dynamotor 31 driven through a freewheel by the shaft $q$. In order to start the alternator, the flywheel 32 is rotated at a suitable speed to develop sufficient kinematic energy, whereupon the rheostat 36 is operated in order to produce progressive magnetic coupling between the flywheel 32 and the flywheel 14. Movement is thus transmitted to the engine and the stored energy of the flywheels brings about the first compression strokes and the first injections of fuel into the cylinders.

The thermomagnetic linear alternators described are self-contained pieces of equipment and replace both a heat engine and a rotary alternator, requiring no other transmission arrangements than that formed by the elements of a light and simple kinematic linkage which does not have to transmit anything more than a very low power, said power being made up of the power taken by the ancillary equipment and the small random power differences which may exist between the two elements of tandm-coupled heat engines.

Self-evidently, the invention is in no way limited to the embodiments which have just been described nor to the design procedures indicated in the description and illustrated in the drawing. In particular it is applicable to the production of three-phase or six-phase currents, or more generally polyphase currents of any given number of phases.

What is claimed is:

1. The method of generating a sinusoidally varying voltage, comprising the steps of: establishing at least one magnetic circuit; reciprocating at least one pair of superposed perforated members across said circuit in respectively opposite directions at substantially constant speed during at least a portion of each reciprocation, said perforations operating to vary the reluctance of said magnetic circuit at least during said periods of substantially constant speed; and controlling the reciprocations of said members so that each period of substantially constant speed of one is produced simultaneously with a period of substantially constant speed of the other.

2. The method defined in claim 1 wherein the speeds of said members is variable at the end portions of their respective reciprocations, and including the step of varying the flux density in said magnetic circuit during said periods of variable speed to compensate for said speed variations.

3. The method of claim 1 wherein a plurality of pairs of said members are reciprocated by a pair of opposed piston engines; operating said engines 180° out of phase; causing each engine to drive respectively different pairs of members; limiting the movements of said members across said magnetic circuit to only those portions of their travel which are of substantially constant speed; and alternately directing the voltages generated by said plurality of pairs of members to a delivery circuit.

4. A linear motor alternator comprising:
at least one tandem opposed piston engine having a cylinder, a first pair of pistons in said cylinder defining therebetween a first combustion chamber and a second pair of pistons and defining therebetween a second combustion chamber;
a first movable member interconnecting one piston of each pair for simultaneous movement in the same direction and a second movable member interconnecting the other pistons of each pair for simultaneous movement in the same direction;
a crankshaft of small inertia having diametrically opposed crank pins;
connecting rods respectively connecting said crank pins to said first and second movable members whereby to enforce said members to reciprocate in opposite directions;
at least one series of inductors comprising field magnets and pole pieces defining a magnetic circuit having an air gap; and
a pair of frames of perforated magnetic material mounted for reciprocation in said air gap, each of said frames being drivingly connected to a respective one of said movable members for reciprocation thereby.

5. A linear alternator defined in claim 4 wherein said perforations are shaped, in a direction transverse to their direction of motion, to produce a sinusoidal variation of flux in said magnetic circuit.

6. An alternator as defined in claim 4 including a flywheel secured to said crankshaft and drivingly connected to auxiliary driven means, the total inertia of said flywheel and auxiliary driven means being small relative to the inertia of said pistons, movable members and frames.

7. A linear alternator as defined in claim 4 wherein the dimension of said air gap, in the direction of motion of said frames, is equal to one-half the stroke of said engine.

8. A linear alternator as defined in claim 4 wherein each magnet is provided with a slot at said air gap and an inductor coil is positioned in the slot, the portions of said magnets adjacent said slots comprising pole faces; the perforations in said frames being bounded by longitudinal edges substantially coincident with the edges of said air gap and of a length equal to an integral multiple of the height of a pole face and one slot, and by opposed V-shaped edge.

9. A linear alternator as defined in claim 4 wherein said field magnets are energized by an excitation generator connected thereto by a rheostat for varying the intensity of the excitation current as a function of the speed of said frames during the end quarters of their strokes; said rheostat having a slide movable with a frame and arranged to slide on two fixed spaced resistance coils extending parallel to the direction of movement of said frame, the pitch of the turns of each coil varying from its outer end, toward the other coil.

10. A linear alternator as defined in claim 4 comprising: two identical tandem motors:
one first pair of two frames extending in the air gap of one first set of inductors and attached to the two movable elements of the first motor;
a second pair of two frames extending in the air gap of a second set of inductors and attached to the two movable elements of the second motor;
said crankshaft being common to the two motors and having four crank pins in quadrature, two crank pins diametrically opposed being connected by connecting rods to the two movable elements of the first motor, and the two other crank pins diametrically opposed in quadrature with respect to the previous ones being connected by connecting rods to the two movable elements of the second motor;
perforations in each frame being located opposite the corresponding inductors during the end quarter strokes.

11. A linear alternator as defined in claim 10 wherein each magnet is provided with a slot at said air gap and an inductor coil is positioned in the slot, the portions of said magnets adjacent said slots comprising pole faces; the sum of the heights of a slot and pole face is equal to one-half a stroke of the motors; the inductors of one series being axially offset from the inductor of the other series by a distance equal to one-half a stroke of the engines.

12. A linear alternator as defined in claim 10 wherein each magnet is provided with a slot at said air gap and an inductor coil is positioned in the slot, the portions of said magnets adjacent said slots comprising pole faces; the sum of the heights of a slot and a pole face is equal to one-quarter of a stroke of the motors; the inductors of one series being axially offset from the inductors of the other series by a distance equal to one-half a stroke of the engines.

References Cited

UNITED STATES PATENTS

| | | | |
|---|---|---|---|
| 3,247,406 | 4/1966 | Toesca | 310—15 |
| 1,268,265 | 6/1918 | Murray | 310—27 |
| 3,328,656 | 6/1967 | Dotson | 310—35 |
| 3,443,111 | 5/1969 | Monpetit et al. | 310—15 XR |
| 1,232,174 | 7/1917 | Bachelet | 310—23 |
| 521,269 | 1894 | Michl | 335—282 XR |
| 2,636,139 | 4/1953 | Winget | 310—12 XR |
| 3,263,105 | 7/1966 | Heyek | 310—22 XR |
| 1,613,033 | 1/1927 | Hawkins | 310—15 XR |

FOREIGN PATENTS

| | | |
|---|---|---|
| 1,472,988 | 3/1967 | France. |
| 830,433 | 1938 | France. |
| 1,130,451 | 2/1957 | France. |
| 496,658 | 4/1930 | Germany. |

MILTON O. HIRSHFIELD, Primary Examiner

B. A. REYNOLDS, Assistant Examiner

U.S. Cl. X.R.

290—1; 310—19, 20